US 6,463,097 B1

(12) United States Patent
Held et al.

(10) Patent No.: US 6,463,097 B1
(45) Date of Patent: Oct. 8, 2002

(54) RATE DETECTION IN DIRECT SEQUENCE CODE DIVISION MULTIPLE ACCESS SYSTEMS

(75) Inventors: Ingolf Held, Campbell, CA (US); Albert Chen, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/343,648

(22) Filed: Jun. 29, 1999

Related U.S. Application Data
(60) Provisional application No. 60/104,652, filed on Oct. 16, 1998.

(51) Int. Cl.[7] ................................................. H04B 3/46

(52) U.S. Cl. ......................... 375/225; 375/341; 370/252

(58) Field of Search ................................ 375/142, 144, 375/148, 150, 225, 341; 370/252; 714/795, 774

(56) References Cited

U.S. PATENT DOCUMENTS

| | | | | |
|---|---|---|---|---|
| 6,097,716 A | * | 8/2000 | Abrishamkar | 370/342 |
| 6,112,325 A | * | 8/2000 | Burshtein | 714/774 |
| 6,134,278 A | * | 10/2000 | Abrishamkar et al. | 370/342 |
| 6,147,964 A | * | 11/2000 | Black et al. | 370/209 |
| 6,167,079 A | * | 12/2000 | Kinnunen et al. | 370/232 |
| 6,175,590 B1 | * | 1/2001 | Stein | 375/225 |

FOREIGN PATENT DOCUMENTS

| | | | | |
|---|---|---|---|---|
| EP | 0763902a1 | 3/1997 | .......... | H03M/13/00 |
| WO | WO9805128 | 2/1998 | ............ | H04B/1/70 |

OTHER PUBLICATIONS

By Cohen E. Et Al.: "Multi–Rate Detection for the IS–95 CDMA Forward Traffic Chnanels"; IEEE Global Telecommunications Conference (Globecom), Nov. 14, 1005 pp. 1789–1793.

By Qualcomm, Entitled: An Overview of the Application of Code Division (CDMA) to Digital Cellular Systems and Personal Cellular Networks, Submitted by Qualcomm to TIA TR45.5 on Mar. 28, 1992, pp. 1–58.

By Globecom "Multi–Rate Detection for the IS–95 CDMA Forward Traffic Channels", Nov. 14–16, 1995, pp. 1789–1793.

By IEEE International Conference on Communications, 1996 "Multi–Rate Detection for the IS–95 CDMA Forward Traffic Channels Using the 13KBPS Speech Coder" Conference Record vol3 of 3 pp. 1844–1848.

By ESSCIRC "VITERBI Decoder for CDMA System with Variable Data Rates" Sep. 19–21, 1995, pp. 446–449.

* cited by examiner

Primary Examiner—Amanda T. Le
(74) Attorney, Agent, or Firm—Jack D. Slobod

(57) ABSTRACT

A method of rate detection at a receiving end of a code division multiple access (CDMA) system, in which system the effective data rate is variably selected at the transmitting end from an applicable rate set including a full rate and lower rates, each lower rate being the full rate divided by a different integer, and encoded symbols are repeated for the lower rates to maintain a constant apparent bit or symbol transmission rate. The data rate is first determined by a coarse decision method employing symbol repetition characteristics before any Viterbi decoding of the data, the data is de-punctured and de-repeated where required, and first Viterbi decoded at the first determined data rate, and data available from or after the first Viterbi decoding is evaluated to determine whether to select the data rate as equal to the first determined data rate.

13 Claims, 3 Drawing Sheets

RATE DETECTION IN DIRECT SEQUENCE CODE DIVISION MULTIPLE ACCESS SYSTEMS

RELATED APPLICATIONS

This application claims internal priority of the Provisional Application No. 60/104,652, filed Oct. 16, 1998.

BACKGROUND OF THE INVENTION

1. Field of the Invention

The present invention relates to methods of rate detection at a receiving end of a digital communications system, such as a code division multiple access (CDMA) system, in which system the information data rate is variably selected at the transmitting end from an applicable rate set including a full rate and lower rates, each lower rate being the full rate divided by a different integer, and data is repeated for the lower rates to maintain a constant apparent data transmission rate. In its particular aspects, the present invention relates to a rate detection method in which a rate determination or classification decision process uses measurements of repetition characteristics of data which has not been de-repeated.

2. Description of the Related Art

Such a rate detection method is generally known from Edith Cohen and Hui-Ling Lou, "Multi-Rate Detection for the IS-95 CDMA Forward Traffic Channels, IEEE Global Telecommunications Conference 1995.

"In 1992, a direct sequence code division multiple access (DS-CDMA) system was adopted as Interim Standard 95 (IS-95) by the Telecommunications Industry Association (TIA) for deployment in the cellular band at 800 MHz. After successful field tests and trial systems, the IS-95 system is now operating with tens of millions of subscribers."

CDMA is based on spread spectrum technology originally developed by the Allies during World War II to resist enemy radio jamming. Spread spectrum signals are characterized by a bandwidth W occupied by signals in a channel much greater than the information rate R of the signals in bit/s. Thus, a spread spectrum signal inherently contains a kind of redundancy which can be exploited for overcoming several kinds of interference (including signals from other users in the same band and self-interference in the sense of delayed multipath components) introduced by the channel. Another key property of spread spectrum signals is pseudo-randomness. Therefore, the signal appears to be similar to random noise, making it difficult to demodulate by receivers other than the intended ones. In CDMA systems, users share a common channel bandwidth and users are distinguished by different code sequences. In the case of IS-95 each communication with a user is modulated or scrambled by long and short Pseudo Noise (PN) sequences and also modulated by a specific one of a set of orthogonal sequences, known as Walsh codes, which is assigned to the user. The latter modulation is known as applying a Walsh cover. Thus, a particular receiver can recover a certain transmitted signal by applying the PN sequences, and also the Walsh sequence used by the corresponding transmitter for the particular receiver.

In the IS-95 DS-CDMA system variable information data rates are used according to the voice activity detected by the voice encoder. This enables a reduction in transmitted power at the lower rates leading to a reduced average transmitted power per user and consequent increase in capacity of the system. Two sets of information data rates (Rate Sets 1 and 2) can be encoded, depending on the implemented voice encoder each set comprising full rate, and lower rates of half rate, quarter rate, and eighth rate. For the lower rates, symbols are repeated to achieve the same apparent symbol transmission rate as when full rate is used. In Rate Set 2, there are 50% more symbols in a frame than in Rate Set 1, but prior to transmission one third of the Rate Set 2 symbols are punctured so that in both rate sets the same number of symbols in a frame are transmitted. The information data rate can change from frame to frame, but information indicating the currently used data rate is not transmitted along with the speech data. Therefore, the receiver has to detect the data rate by hypothesis testing. The algorithm implemented by rate classification or decision logic which determines which of the possible information data rates is utilized for the current frame is called a Rate Detection Algorithm (RDA).

In accordance with the known rate detection method utilizing repetition characteristics of data, prior to any de-repetition, measures are formed for Rate Set 1 which determine how well symbols match within successive groups of 2, 4, and 8 symbols. Such method, while requiring only a relatively small amount of computational resources, is not of sufficient reliability for an IS-95 DS-CDMA system that a rate decision could be based solely thereon. Further, such known method yields even poorer results when applied to Rate Set 2, because it does not take into account the effects of puncturing.

Other information which could be used for rate detection includes CRC checking results (which in accordance with IS-95 are available for all data rates except quarter and eighth rates in Rate Set 1), Viterbi decoder survivor metrics, and correlations between re-encoded data and data entering the decoder for each possible data rate. The latter two methods, which utilize data available from or after the Viterbi decoding at each of the possible data rates, and for each data frame, are inherently more reliable, but are computationally intensive. The method employing such correlations makes particularly intensive use of computational resources since, each frame, for each of the possible data rates the data must not only be Viterbi decoded (after de-puncturing and de-repeating as required), but also convolutional re-encoded in order to form correlations between the re-encoded data and the data entering the Viterbi decoding for each possible data rate.

Intensive use of computational resources is undesirable, particularly in wireless handsets, because battery life is generally reduced as the number of instructions per section required to be executed by a digital signal processor (DSP) within the handset increases. A significant power savings is gained when the DSP has a relatively high proportion of slack time, during which the DSP can go into an idle mode.

OBJECTS AND SUMMARY OF THE INVENTION

It is an object of the present invention to provide an improved method of rate detection at a receiving end of a digital communications system which is highly reliable but on average utilizes a relatively small amount of computational resources. It is a further object that the rate detection method take into account any pattern of puncturing used for an applicable rate set.

These and other objects of the present invention are satisfied by such a method of rate detection wherein the data rate of received convolutional encoded data is first determined by a coarse decision method which is computationally simple because it is based on measures of the data computed before any Viterbi decoding ("pre-decoding" measures). Then, using data available from or after the Viterbi decoding at the first determined data rate to obtain or form a "post-decoding" measure, an evaluation is made whether the first determined data rate should be selected as the actual data rate, and preferably, also whether there is high or low confidence in this selection. Only when, the evaluation does not result in the selection of the first determined data rate as the actual data rate, is a more accurate but computationally intensive fine decision method resorted to, using post decoding measures obtained or calculated at one or more other data rates.

In accordance with the invention, pre-decoding measures of repetition patterns in the data are calculated for each of the possible lower data rates, and the coarse rate decision is made using these measures and a first set of thresholds. In the calculation of the pre-decoding measures for Rate Set 2, it is taken into account that the data has been punctured according to a predetermined pattern.

In order to evaluate the result of the coarse decision method, the convolutional encoded data is de-punctured and de-repeated where required, Viterbi decoded, and convolutional re-encoded, all with respect to the first determined data rate. Then there is first formed a correlation between the received convolutional encoded data after any de-puncturing and de-repetition at the first determined data rate and the convolutional re-encoded data, and this first formed correlation is compared with a predetermined threshold associated with the first determined data rate, this threshold being contained in a second set of thresholds. The actual data rate is selected as the first determined rate when the first formed correlation is greater than (or is equal to) this threshold.

If on the other hand the first formed correlation is less than the threshold to which it is compared, the fine decision method is applied wherein the received convolutional encoded data is second Viterbi decoded in accordance with at least one other data rate of the rate set, after de-puncturing in the case of Rate Set 2, and de-repetition if the at least one other data rate is one of the lower rates, and the data rate is second determined utilizing data available from or after the second Viterbi decoding.

Further, in accordance with the present invention, the fine decision method preferably uses correlations formed between the received convolutional encoded data, after any de-puncturing, and any de-repetition, and convolutional re-encoded data, at the full rate and each lower data rate in the applicable rate set, wherein data rates are considered beginning with the full rate, and the determined data rate is set equal to the considered rate when the correlation formed at the considered data rate satisfies a set of one or more conditions One of the conditions is the correlation formed at the considered data rate plus a second predetermined threshold associated with the considered data rate being greater than a largest of the correlations formed at the other data rates. A second condition is, when Cyclic Redundancy Code (CRC) checking is available for the considered data rate, that a CRC check with respect to the decoded received convolution encoded data for the considered data rate does not fail. If CRC checking is not available for the considered data rate, the second condition is the correlation formed for the considered data rate being greater than a third predetermined threshold associated with the considered data rate.

Since the coarse decision method provides the correct rate decision most of the time, and the fine decision method need only be applied a small fraction of the time, the rate determination method of the present invention uses only slightly more computational resources than the coarse decision method but has the reliability of the fine decision method.

Other objects, features and advantages of the present invention will become apparent upon perusal of the following detailed description when taken in conjunction with the appended drawing, wherein:

DETAILED DESCRIPTION OF THE PREFERRED EMBODIMENTS

Figure 1:
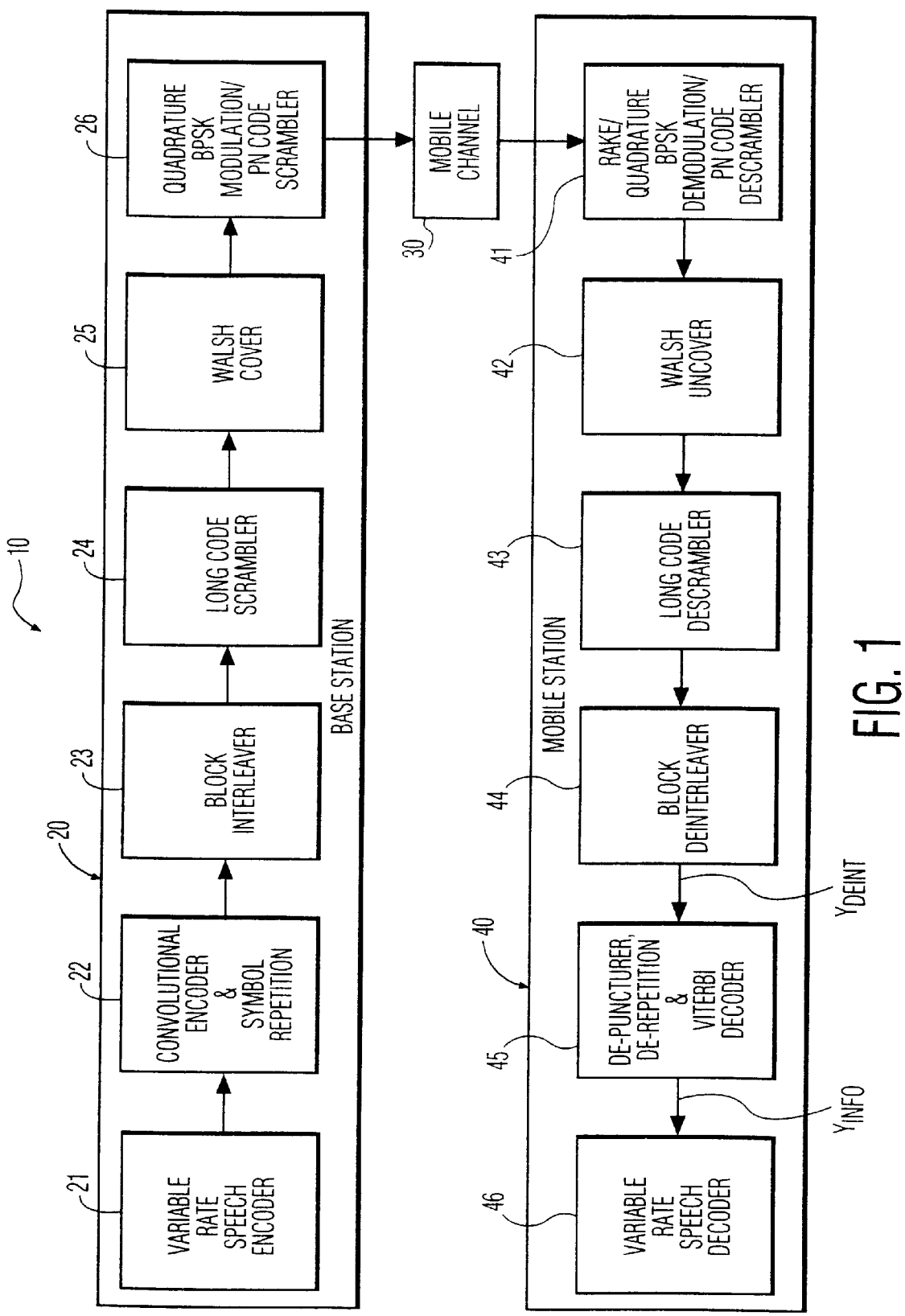
FIG. 1 is a basic functional schematic diagram of a DS-CDMA system including a transmitting end and a receiving end, the receiving end including a block performing de-puncturing, de-repetition and Viterbi decoding.

Referring first to FIG. 1 of the drawing, a wireless CDMA cellular type system 10 is shown including at least one base station 20 and at least one mobile station or handset 40, which at the level of detail shown, is conventional. For the sake of explanation, base station 20 is taken as the transmitting end and mobile station 40 is taken as the receiving end with respect to data flowing between them via a mobile channel 30. It should be understood that both base station 20 and mobile station 40 can transmit and receive, and each must perform a rate determination when functioning as a receiving end. Consequently, where the context permits for generality purposes, base station 20 is referred to as a transmitting end 20, and mobile station 40 is referred to as a receiving end 40. It should also be appreciated that the functional blocks shown are conceptual as viewed by persons of ordinary skill in the art, who are well aware that they are appropriately implemented by the combination of an RF section and a baseband section, the latter including a digital signal processor and/or microprocessor utilizing firmware together with an application specific integrated circuit (ASIC).

At transmitting end 20, after analog-to-digital conversion of inputted analog human speech (not shown), the digitized speech is processed by a variable-rate speech encoder 21, which pursuant to IS-95 may be based on the Qualcomm Code-Excited-Linear-Prediction (QCELP) voice encoding algorithm. The variable-rate feature forms an integral part of the Voice Activity Detection (VAD) approach employed in the considered system, wherein either Rate Set 1 or Rate Set 2 of IS-95 is used.

As usual in digital communication models, source encoding is followed by channel encoding, which is realized as a convolutional encoder and symbol repeater 22, the output of which are frames containing a plurality of possibly repeated multibit symbols. In order to overcome the effects of noise and interference introduced into the signal during transmission through the channel, convolutional encoding adds, in a controlled manner, redundancy in the data sequence. The four rates of Rate Set I after convolutional encoding are 19.2 kbps (Full Rate), 9.6 kbps (Half Rate), 4.8 kbps (Quarter Rate) and 2.4 kbps (Eighth Rate). Rate Set 2 provides the four possible rates 28.8 kbps, 14.4 kbps, 7.2 kbps and 3.6 kbps. An additional puncturing is performed in Rate Set 2 by deleting two symbols (the fourth and sixth) out of each six. In order to maintain a constant transmission rate of 19.2 kbps, the encoded symbols are repeated once, three times and seven times for Half Rate frames, Quarter Rate frames and Eighth Rate frames, respectively.

The reliability of the information transmission using convolutional encoding will only increase when the errors caused by the channel are statistically independent. In fact, the mobile channel 30 is characterized by multipath and fading. Therefore, errors will appear in clusters. As an effective way for transforming a burst error channel into a channel having independent errors, interleaving of the coded data is employed. Block interleaver 23 permutes the sequence of symbols received from convolutional encoder and symbol repeater 22 by formatting them in a rectangular array and reading them out column-wise. The described procedure achieves time diversity in the data sequence which results in a "broken" channel memory. Next, a long code scrambler 24 combines the data sequence with a maximum length Pseudo Noise (PN) sequence (long code) of period $2^{42}-1$ by using a modulo-2 addition (not shown). A unique offset of the long code for each forward traffic channel enables voice privacy. Walsh Cover block 25 combines the scrambled and coded symbols from long code scrambler 24 with a row of a dimension-64 Hadamard matrix. This process provides orthogonal channelization (in the absence of multipath) among all transmitted channels of one base station. In Quadrature BPSK/PN Code Scrambler block 26, the data stream is again scrambled by the so-called PN short code (also pilot PN sequence), a PN code of period $2^{15}-1$, by applying Binary Phase Shift Keying (BPSK) modulation with two separate PN short codes to two quadrature branches carrying the same signal. By using the short code, the mobile stations 40 can distinguish between base stations.

"The receiving end or mobile station 40 in general reverses the operations done at the transmitting end. As is well known, a cascade of a rake receiver/quadrature BPSK demodulation/PN code descrambler block 41, Walsh uncover block 42, long code descrambler 43, and block deinterleaver 44 receive from mobile channel 30 plural versions of the transmitted signal which are relatively delayed due to multipath and recovers a sequence of symbols at an unknown data rate. Block deinterleaver 44 reverses the interleaving by formatting received symbols in a rectangular array and reading them out row-wise to produce the signal or series of multibit symbols $y_{deint}$. The data $y_{deint}$ is preferably four bits in length, and interpreted as indicating a double ended range of 15 possible levels, corresponding to the integer values ranging from −7 to +7. Next, the de-repetition and Viterbi decoding block 45 performs any needed de-puncturing (for rate set 2)) and de-repetition (for the lower data rates) and decodes the convolutional encoded data sequence to produce $Y_{info}$. As is well known, a Viterbi decoding process recursively finds the most likely state transition sequence in a trellis. In order to accomplish the decoding, block 45 must determine the data rate on a frame by frame basis. Lastly, the Viterbi decoded data $y_{info}$ at the determined data rate is applied to a variable rate speech decoder 46 which obtains a high quality digital voice signal that is applied to a digital to analog converter (not shown)."

Figure 2:
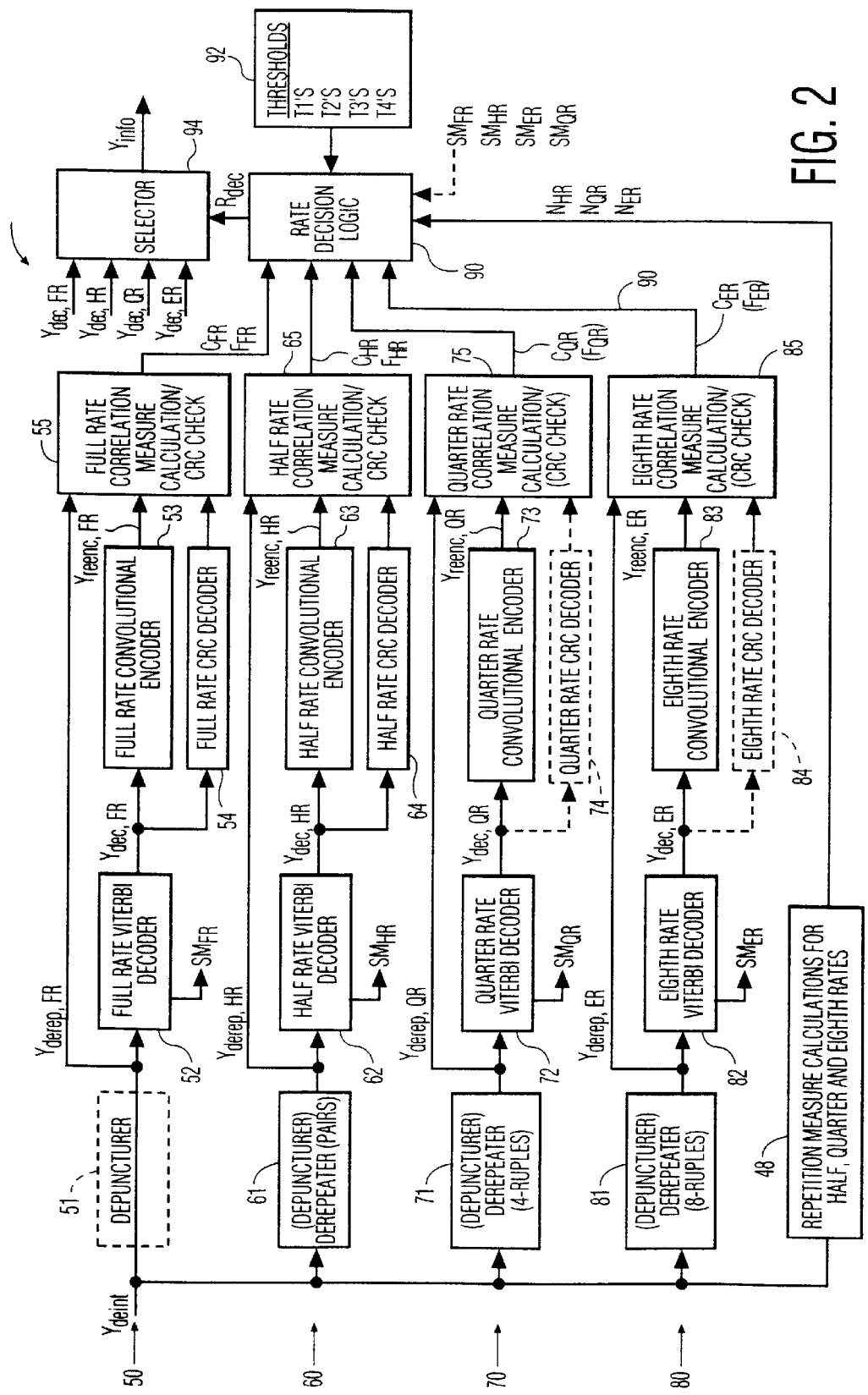
FIG. 2 is a functional schematic diagram of the de-puncturing, de-repetition and Viterbi decoding block in FIG. 1 including a plurality of measure calculation blocks feeding a rate decision logic block.

De-Puncturing, de-repetition and Viterbi decoding block 45 is shown in more detail in FIG. 2, and is seen to comprise a repetition measures calculation block 48, and four branches 50, 60, 70, and 80 to which the de-interleaved data or series of symbols $y_{deint}$ is applied. Repetition measures calculation block 48 calculates normalized pre-decoding measures of repetition patterns $N_{HR}$, $N_{QR}$, and NER corresponding to half, quarter and eighth rates, respectively, in the applicable rate set. The four branches 50, 60, 70, and 80 indicate the ability to compute scaled correlations $C_{FR}$, $C_{HR}$, $C_{QR}$, and $C_{ER}$ between data entering the Viterbi decoder $y_{derep,FR}$, $y_{derep,HR}$, $Y_{derep,QR}$, and $y_{derep,ER}$ and re-encoded data $y_{reenc,FR}$, $y_{reenc,HR}$, $Y_{reenc,QR}$, and $y_{reenc,ER}$ for each of full rate, half rate, quarter rate, and eighth rate, respectively, in the applicable rate set, and CRC checking results $F_{FR}$, $F_{HR}$, $F_{QR}$, and $F_{ER}$ for all rates except quarter rate and eighth rate in IS-95 Rate Set 1.

Thus, in branch 50 the de-interleaved data $y_{deint}$ (which for purposes of symmetry is defined as full rate de-punctured, in the case of Rate Set 2, and de-repeated data $Y_{derep,FR}$) is applied to full rate Viterbi decoder 52 to produce decoded full rate data $y_{dec,FR}$. The decoded full rate data $y_{dec,FR}$ is applied to full rate convolution encoder 53 to produce full rate re-encoded data $y_{reenc,FR}$ and is also applied to full rate CRC decoder 54. In block 55, the correlation CFR between full rate re-encoded data $y_{reenc,FR}$ and full rate de-repeated data $y_{derep,FR}$ is calculated and the CRC checking result $F_{FR}$ is determined.

In branch 60 the de-interleaved data $y_{deint}$ is applied to de-puncturer and de-repeater 61 which after de-puncturing when the applicable rate set is Rate Set 2, extracts symbols from symbol pairs or 2-tuples to form half rate de-repeated data $y_{derep,HR}$ which is in turn applied to half rate Viterbi decoder 62 to produce decoded half rate data $y_{dec,HR}$. The decoded half rate data $y_{dec,HR}$ is applied to half rate convolution encoder 63 to produce half rate re-encoded data $y_{reenc,HR}$ and is also applied to half rate CRC decoder 64. In block 65, the correlation $C_{HR}$ between half rate re-encoded data $y_{reenc,HR}$ and half rate de-repeated data $y_{derep,HR}$ is calculated and the CRC checking result $F_{HR}$ is determined.

In branch 70 the de-interleaved data $y_{deint}$ is applied to de-puncturer and de-repeater 71 which, after de-puncturing in the case of Rate Set 2, extracts symbols from 4-tuples to form quarter rate de-repeated data $y_{derep,QR}$ which is in turn applied to quarter rate Viterbi decoder 72 to produce decoded quarter rate data $y_{dec,QR}$. The decoded quarter rate data $y_{dec,QR}$ is applied to quarter rate convolution encoder 73 to produce quarter rate re-encoded data $y_{reenc,QR}$ and, when the applicable rate set is Rate Set 2, is also applied to quarter rate CRC decoder 74. In block 75, the correlation $C_{QR}$ between quarter rate re-encoded data $y_{reenc,QR}$ and quarter rate de-repeated data $y_{derep,QR}$ is calculated and, when the applicable rate set is rate set 2, the CRC checking result $F_{QR}$ is determined.

Similarly, in branch 80 the de-interleaved data $y_{deint}$ is applied to de-puncturer and de-repeater 81 which, after de-puncturing in the case of Rate Set 2, extracts symbols from redundant 8-tuples to form eighth rate de-repeated data $y_{derep,ER}$ which is in turn applied to eighth rate Viterbi decoder 82 to produce decoded eighth rate data $y_{dec,ER}$. The decoded eighth rate data $y_{dec,ER}$ is applied to eighth rate convolution encoder 83 to produce eighth rate re-encoded data $y_{reenc,ER}$ and, when the applicable rate set is Rate Set 2, is also applied to eighth rate CRC decoder 84. In block 85, the correlation $C_{ER}$ between eighth rate re-encoded data $y_{reenc,ER}$ and eighth rate de-repeated data $y_{derep,ER}$ is calculated and, when the applicable rate set is Rate Set 2, the CRC checking result $F_{ER}$ is determined.

Since the various computations are implemented on a DSP they are done as needed in order to conserve computational resources. Consequently, the parallel layout of block 48 and branches 50, 60, 70, and 80 merely signify the functional ability to compute and provide the pre-decoding measures of repetition patterns and the post-decoding correlations and available CRC checking results to rate decision or classification logic 90 which makes a rate decision $R_{dec}$, it being understood that the actual time sequence of these actions will be discussed shortly with respect to the flow chart shown in FIG. 3. In response to rate decision $R_{dec}$ a selector 94 selects the indicated decoded signal among $y_{dec,FR}$, $y_{dec,HR}$, $y_{dec,QR}$, and $y_{dec,ER}$ as the output data $y_{info}$ from de-repetition and Viterbi decoder block 45.

Figure 3:
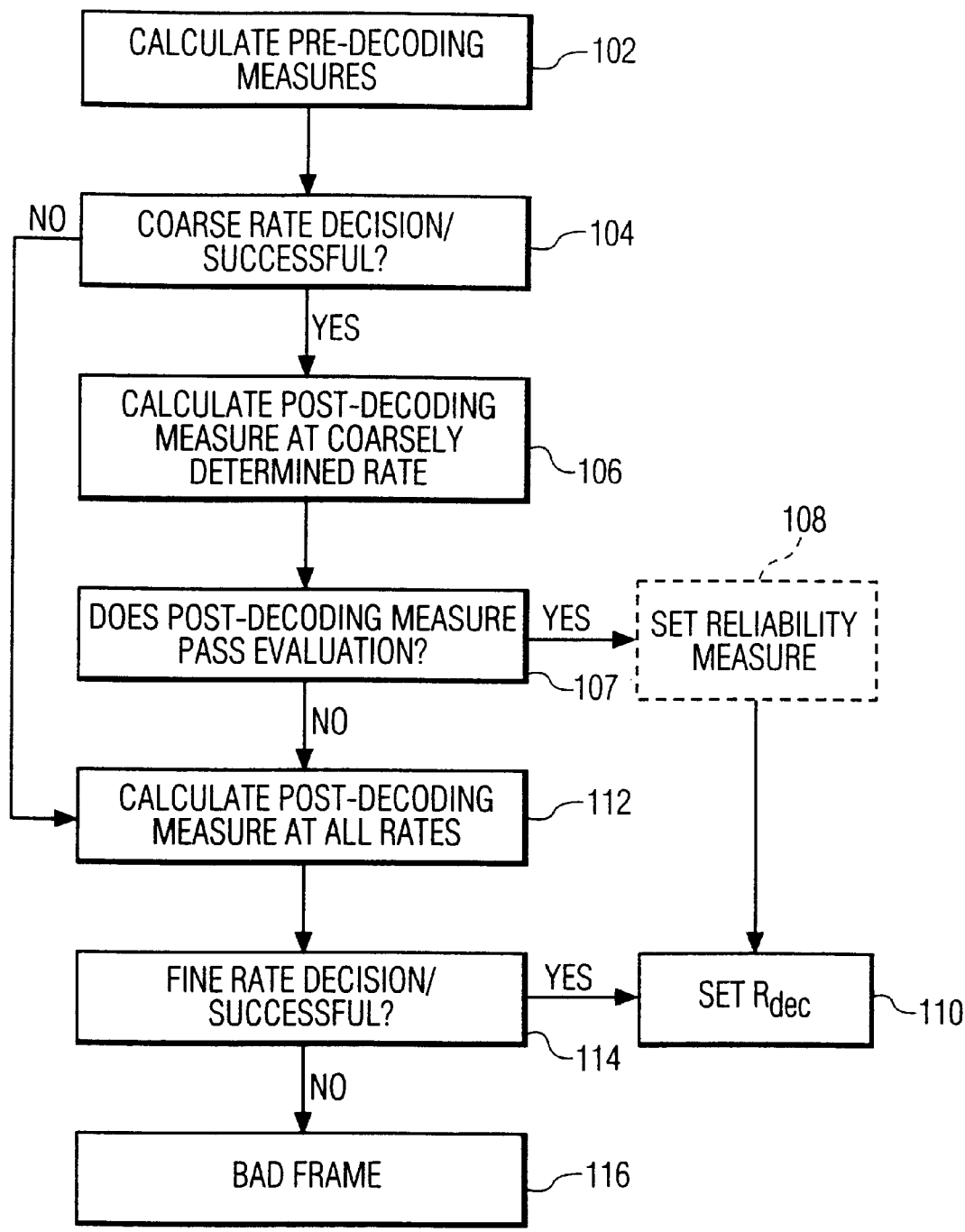
FIG. 3 is a flow chart of the operations performed by the calculation blocks rate classification logic block in FIG. 2 for IS-95 Rate Set 1 in accordance with the principles of the present invention.

Referring to FIG. 3, at the beginning step 102 the pre-decoding measures of repetition patterns $N_{HR}$, $N_{QR}$, and $N_{ER}$ are calculated using block 48 in FIG. 2, and passed to rate decision logic block 90, which then attempts to make a coarse rate decision at step 104. If successful, step 106 is reached where, using the applicable one of branches 50, 60, 70, and 80, a post-decoding measure, namely a scaled correlation between data entering the Viterbi decoder and re-encoded data is calculated only at the data rate indicated by the coarse rate decision, and passed to rate decision logic 90. Then at step 107, an evaluation of this post-decoding measure is performed and it is determined whether it passes or fails the evaluation. If it passes, a reliability measure is also set at step 108, which measure can be taken into account in the rate decision in the subsequent frame, and at step 110 the actual rate decision $R_{dec}$ is set equal to the coarse rate decision.

If the coarse rate decision at step 104 is unsuccessful, or in step 107 the post decoding measure fails the evaluation, then step 112 is reached, where post-decoding measures are formed at each data rates, using any post-decoding measure formed at step 106. Then, at step 114 a final rate decision is made using all the calculated post-decoding measures. The fine rate decision, if successful, yields the setting of the actual rate decision Rdec at step 110, or if unsuccessful, the determination at step 116 of a bad frame.

In the calculation of the normalized measures of repetition patterns $N_{HR}$, $N_{QR}$, and $N_{ER}$ corresponding to half, quarter and eighth rates, respectively block 48 at step 51, the following equations (which are generally as indicated by the aforementioned article Edith Cohen and Hui-Ling Lou, "Multi-Rate Detection for the IS-95 CDMA Forward Traffic Channels", IEEE Global Telecommunications Conference 1995) are used for Rate Set 1:

$$M_{HR} = \sum_{i=0}^{191} |y_{2i} + y_{2i+1}|$$

$$M_{QR} = \sum_{i=0}^{95} |y_{4i} + y_{4i+1} + y_{4i+2} + y_{4i+3}|$$

$$M_{ER} = \sum_{i=0}^{23} \left| \sum_{j=8i}^{8i+7} y_j \right|$$

$$LM_{HR} = \sum_{i=0}^{191} ||y_{2i}| - |y_{2i+1}||$$

$$UM_{HR} = \sum_{i=0}^{191} (|y_{2i}| + |y_{2i+1}|)$$

$$N_{HR} = \frac{M_{HR} - LM_{HR}}{UM_{HR} - LM_{HR}}$$

-continued $$LM_{QR} = \sum_{i=0}^{95} ||y_{4i} + y_{4i+1}| - |y_{4i+2} + y_{4i+3}||$$

$$UM_{QR} = \sum_{i=0}^{95} (|y_{4i} + y_{4i+1}| + |y_{4i+2} + y_{4i+3}|)$$

$$LM_{ER} = \sum_{i=0}^{47} \left| \left| \sum_{j=8i}^{8i+3} y_j \right| - \left| \sum_{j=8i+4}^{8i+7} y_j \right| \right|$$

$$UM_{ER} = \sum_{i=0}^{47} \left( \left| \sum_{j=8i}^{8i+3} y_j \right| - \left| \sum_{j=8i+4}^{8i+7} y_j \right| \right)$$

$$N_{QR} = \frac{M_{QR} - LM_{QR}}{UM_{QR} - LM_{QR}}$$

$$N_{ER} = \frac{M_{ER} - LM_{ER}}{UM_{ER} - LM_{ER}}$$

In the foregoing, the measures $M_{HR}$, $M_{ER}$, $M_{QR}$ represent sums of absolute values of sums of successive sequences of two, four, and eight symbols, respectively. These measures are then normalized to form $N_{HR}$, $N_{ER}$, and $N_{QR}$ by using computed upper limits $UM_{HR}$, $UM_{QR}$, and $UM_{ER}$, and lower limits $LM_{HR}$, $LM_{QR}$, and $LM_{ER}$, respectively.

For Rate Set 2, the equations for $N_{HR}$, $N_{QR}$, and $N_{ER}$ are the same as above, but $M_{HR}$, $M_{QR}$, $M_{ER}$, $LM_{HR}$, $LM_{QR}$, $LM_{ER}$, $UM_{HR}$, $UM_{QR}$, and $UM_{ER}$, are calculated as follows:

$$M_{HR} = \sum_{i=0}^{95} |y_{4i} + y_{4i+1}|$$

$$M_{QR} = \sum_{i=0}^{47} (|y_{8i} + y_{8i+1} + y_{8i+2}| + |y_{8i+3} + y_{8i+4} + y_{8i+5}| + |y_{8i+6} + y_{8i+7}|)$$

$$M_{ER} = \sum_{i=0}^{23} \left( \left| \sum_{j=16i}^{16i+5} y_j \right| + \left| \sum_{j=16i+6}^{16i+10} y_j \right| + \left| \sum_{j=16i+11}^{16i+15} y_j \right| \right)$$

$$LM_{HR} = \sum_{i=0}^{95} ||y_{4i}| - |y_{4i+1}||$$

$$UM_{HR} = \sum_{i=0}^{95} (|y_{4i}| + |Y_{4i+1}|)$$

$$LM_{QR} = \sum_{i=0}^{47} (||y_{8i} + y_{8i+1}| - |y_{8i+2}|| + ||y_{8i+3}| - |y_{8i+4} + y_{8i+5}|| +$$
$$||y_{8i+6}| - |y_{8i+7}||)$$

$$UM_{QR} = \sum_{i=0}^{47} (|y_{8i} + y_{8i+1}| + |y_{8i+2}| + |y_{8i+3}| - |y_{8i+4} + y_{8i+5}| +$$
$$||y_{8i+6}| - |y_{8i+7}|)$$

$$LM_{ER} = \sum_{i=0}^{23} \left( \left| \left| \sum_{j=16i}^{16i+2} y_j \right| - \left| \sum_{j=16i+3}^{16i+5} y_j \right| \right| + \left| \left| \sum_{j=16i+6}^{16i+7} y_j \right| - \left| \sum_{j=16i+8}^{16i+10} y_j \right| \right| + \right.$$
$$\left. \left| \left| \sum_{j=16i+11}^{16i+13} y_j \right| - \left| \sum_{j=16i+14}^{16i+15} y_j \right| \right| \right)$$

$$UM_{ER} = \sum_{i=0}^{23} \left( \left| \sum_{j=16i}^{16i+2} y_j \right| + \left| \sum_{j=16i+3}^{16i+5} y_j \right| + \left| \sum_{j=16i+6}^{16i+7} y_j \right| + \left| \sum_{j=16i+8}^{16i+10} y_j \right| + \right.$$

-continued $$\left( \left| \sum_{j=16i+11}^{16i+13} y_j \right| + \left| \sum_{j=16i+14}^{16i+15} y_j \right| \right)$$

In the above equations for Rate Set 2, a full rate frame prior to de-puncturing consists of 384 symbols. At the lower rates, the repetition patterns are effected by the puncturing of the fourth and sixth symbols of every six. At half rate, each series of six symbols prior to puncturing consisting of three 2-tuples, is reduced by puncturing the fourth and sixth symbols to a series of four symbols consisting of a 2-tuple followed by two different symbols. Thus, at half rate, only alternate pairs of symbols show a repetition.

At quarter rate, each series of twelve symbols prior to puncturing consisting of three 4-tuples, is reduced by puncturing the fourth, sixth, tenth, and twelfth symbols to a series of eight symbols consisting of two 3-tuples followed by a 2-tuple.

Similarly, at eighth rate, each series of twenty-four symbols prior to puncturing consisting of three 8-tuples, is reduced by puncturing the fourth, sixth, tenth, twelfth, sixteenth, eighteenth, twenty-second, and twenty-fourth symbols to a series of sixteen symbols consisting of a 6-tuple followed by two 5-tuples.

It should be readily apparent from the foregoing equations that the measures $M_{HR}$, $M_{ER}$, and $M_{QR}$, for Rate Set 2, as well as the upper limits $UM_{HR}$, $UM_{QR}$, and $UM_{ER}$, and lower limits $LM_{HR}$, $LM_{QR}$, and $LM_{ER}$, take into account the effect that puncturing has made on the repetition patterns.

In making the coarse rate decision in step 104, the following classification logic applies for both Rate Sets 1 and 2 using a first predetermined set of three thresholds $T1_{FR}$, $T1_{HR}$, and $T1_{QR}$:

if $(N_{HR}<T_{FR})$ & $(N_{QR}<T_{FR})$ & $(N_{ER}<T_{FR})$ then $R_{dec}$=FR
else if $\{(N_{HR}+T_{HR})>(N_{QR}+T_{QR})$ & $((N_{HR}+T_{HR})>N_{ER})\}$ then $R_{dec}$=HR
else if $\{(N_{QR}+T_{QR})\geq(N_{HR}+T_{HR})\}$ & $\{(N_{QR}+T_{QR})>N_{ER}\}$ then $R_{dec}$=QR
else if $\{N_{ER}\geq(N_{HR}+T_{HR})\}$ & $\{(N_{ER}\geq(N_{QR}+N_{TR})\}$ then $R_{dec}$=ER
else coarse rate decision unsuccessful The preferred values of the first set of thresholds have been fine tuned over expected values of noise and fading with the assumption of the following probabilities: 0.25 for full rate, 0.4 for half rate, 0.25 for quarter rate, and 0.1 for eighth rate; the values of the thresholds are set forth in the following table:

| Threshold | Rate Set 1 | Rate Set 2 |
|---|---|---|
| $T1_{FR}$ | 0.72 | 0.67 |
| $T1_{HR}$ | −0.06 | −0.15 |
| $T1_{QR}$ | −0.03 | −0.04 |

The post-decoding measure calculated or obtained at step 106 corresponding to the successful coarsely determined data rate is preferably a scaled correlation $C_{FR}$, $C_{HR}$, $C_{QR}$, or $C_{ER}$ between data entering the Viterbi decoder and re-encoded data at the coarsely determined data rate and the applicable rate set. While survivor metrics $SM_{FR}$, $SM_{HR}$, $SM_{QR}$, and $SM_{ER}$, are available from Viterbi decoding at full rate, half rate, quarter rate, and eighth rate, respectively, and could be used as the post-decoding measures, better results are obtained using the scaled correlations.

If the applicable rate set is Rate Set 1, there are 384 symbols in a full rate frame, which after de-repeating are reduced to 192, 96, and 48 symbols for half, quarter, and eighth rates, respectively. The scaled correlations $C_{FR}$, $C_{HR}$, $C_{QR}$, or $C_{ER}$ corresponding to the coarsely determined rate is formed for the frame in accordance with the applicable one of following equations, wherein both the re-encoded symbols $y_{reenc,FR}$, $y_{reenc,HR}$, $Y_{reenc,QR}$, and $y_{reenc,ER}$ and the symbols $y_{derep,FR}$, $y_{derep,HR}$, $y_{derep,QR}$, and $y_{derep,ER}$ entering the decoder have integer values ranging from −7 to +7:

$$C_{FR} = \sum_{i=0}^{383} y_{reenc,FR}(i) \cdot y_{derep,FR}(i)$$

$$C_{HR} = 2 \cdot \sum_{i=0}^{191} y_{reenc,HR}(i) \cdot y_{derep,HR}(i)$$

$$C_{QR} = 4 \cdot \sum_{i=0}^{95} y_{reenc,QR}(i) \cdot y_{derep,QR}(i)$$

$$C_{ER} = 8 \cdot \sum_{i=0}^{47} y_{reenc,ER}(i) \cdot y_{derep,ER}(i)$$

If the applicable rate set is Rate Set 2, the 384 transmitted symbols in a frame are increased by de-puncturing to 576 symbols, and then for the lower data rates are reduced by de-repeating to 288, 144, and 72 symbols for half, quarter, and eighth rates, respectively. The scaled correlations $C_{FR}$, $C_{HR}$, $C_{QR}$, and $C_{ER}$ are formed for a frame in accordance with the following equations, again wherein both the re-encoded symbols $y_{reenc,FR}$, $y_{reenc,HR}$, $Y_{reenc,QR}$, and $y_{reenc,ER}$ and the symbols $y_{derep,FR}$, $y_{derep,HR}$, $y_{derep,QR}$, and $y_{derep,ER}$ entering the decoder have integer values ranging from −7 to +7:

$$C_{FR} = \sum_{i=0}^{575} y_{reenc,FR}(i) \cdot y_{derep,FR}(i)$$

$$C_{HR} = 2 \cdot \sum_{i=0}^{287} y_{reenc,HR}(i) \cdot y_{derep,HR}(i)$$

$$C_{QR} = 4 \cdot \sum_{i=0}^{143} y_{reenc,QR}(i) \cdot y_{derep,QR}(i)$$

$$C_{ER} = 8 \cdot \sum_{i=0}^{71} y_{reenc,ER}(i) \cdot y_{derep,ER}(i)$$

Then, the evaluation in step 107 is done by comparing the computed scaled correlation to a threshold contained in a second set of thresholds. If the threshold is exceeded, the evaluation is passed, resulting in the setting at step 110 of actually determined data rate as equal to the coarsely determined data rate. Also, if the threshold is exceeded a reliability or confidence measure may be set at step 108. For example, if the threshold is not exceeded by a margin equal a predetermined amount, the reliability measure may be set to 1 as a flag indicating that the rate decision is "not reliable", and otherwise it is set to 0, indicating that the rate decision is reliable. A measure of reliability of the rate determination in the last frame is useful in making the rate decision in the next frame, in view of the constraint pursuant to TIA96B, TIA733, and TIA127 that the data rate can only decrease by one rate per frame.

The second set of thresholds for Rate Set 1 are shown in the following table:

| Threshold | Rate Set 1 |
|---|---|
| $T2_{FR}$ | 1285 |
| $T2_{HR}$ | 1306 |
| $T2_{QR}$ | 1322 |
| $T2_{ER}$ | 1362 |

The thresholds for Rate Set 2 are similar to the above, and are easily determined without undue experimentation.

"When a coarsely determined rate is not adopted and step 112 is reached, all the not already calculated post-decoding measures from the current frame are calculated, so that $C_{FR}$, $C_{HR}$, $C_{QR}$, and $C_{ER}$ are now available for the applicable rate set. For Rate Set 1, CRC checking results $F_{FR}$ and $F_{HR}$ are available only for full and half rates, whereas for Rate Set 2, CRC checking results $F_{FR}$, $F_{HR}$, $F_{QR}$, and $F_{ER}$ are available for full, half, quarter, and eighth rates. If CRC checking fails, the CRC checking result is set to logical one; otherwise the CRC checking result has the value logical zero indicating that the CRC checking has not failed."

The fine rate decision is then made at step 114 using the scaled correlations $C_{FR}$, $C_{HR}$, $C_{QR}$, and $C_{ER}$, the available CRC checking results $F_{FR}$, $F_{HR}$, and for Rate Set 2, $F_{QR}$ and $F_{ER}$, a third set of four biasing thresholds $T3_{FR}$, $T3_{HR}$, $T3_{QR}$, and $T3_{ER}$ for the various possible rates in the applicable rate set, and for Rate Set 1, a fourth set of two further thresholds, $T4_{QR}$ and $T4_{ER}$.

The decision logic for Rate Set 1 appears below:

if $\{(C_{FR}+T3_{FR}) \geq \max[C_{HR}, C_{QR}, C_{ER}]\} \& \{F_{FR}=0\}$ then $R_{dec}=FR$ else if $\{(C_{HR}+T3_{HR}) \geq \max[C_{FR}, C_{QR}, C_{ER}]\} \& \{F_{HR}=0\}$ then $R_{dec}=HR$ else if $\{(C_{QR}+T3_{QR}) \geq \max[C_{FR}, C_{HR}, C_{ER}]\} \& \{C_{QR}>T4_{QR}\}$ then $R_{dec}=QR$ else if $\{(C_{ER}+T3_{ER}) \geq \max[C_{FR}, C_{HR}, C_{QR}]\} \& \{C_{ER}>T4_{ER}\}$ then $R_{dec}=ER$ else bad frame The decision logic for Rate set 2 appears below:

if $\{(C_{FR}+T3_{FR}) \geq \max[C_{HR}, C_{QR}, C_{ER}]\} \& \{F_{FR}=0\}$ then $R_{dec}=FR$ else if $\{(C_{HR}+T3_{HR}) \geq \max[C_{FR}, C_{QR}, C_{ER}]\} \& \{F_{HR}=0\}$ then $R_{dec}=HR$ else if $\{(C_{QR}+T3_{QR}) \geq \max[C_{FR}, C_{HR}, C_{ER}]\} \& \{F_{QR}=0\}$ then $R_{dec}=QR$ else if $\{(C_{ER}+T3_{ER}) \geq \max[C_{FR}, C_{HR}, C_{QR}]\} \& \{F_{ER}=0\}$ then $R_{dec}=ER$ else bad frame As appears from the above decision logic for both rate sets, two conditions are applied to test for each possible data rate, in descending rate order, beginning with the full rate. One condition is whether the correlation plus the biasing threshold for the considered rate is greater than or equal to the maximum of the correlations for the other rates. The other condition is that CRC checking, if available for the considered rate, has not failed, and if CRC checking is not available, whether the correlation is greater than or equal to the further threshold for the considered rate.

It should also be appreciated that the various inequalities would work if the relationship "greater than" is used rather than "greater than or equal to" with a slight or no change in the actual predetermined values used for the thresholds.

The threshold values for both rate sets are given in the table below and have been determined to provide good results under expected noise and fading conditions:

| Threshold | Rate Set 1 | Rate Set 2 |
|---|---|---|
| $T3_{FR}$ | 59 | 175 |
| $T3_{HR}$ | 0 (not used) | 95 |
| $T3_{QR}$ | −20 | 112 |
| $T3_{ER}$ | 0 (not used) | 200 |
| $T4_{QR}$ | 1195 | — |
| $T4_{ER}$ | 1122 | — |

As appears from the above table, in actuality biasing thresholds $T1_{HR}$ and $T1_{ER}$ are set to zero for Rate Set 1, so effectively, they are not used.

"It has been determined by analysis that the coarse determination carried out in steps 102 through 107 of FIG. 3 will detect the data rate 90% of the time, so that step 114, requiring Viterbi decoding at all data rates will only be reached approximately 10% of the time. It has been further determined that these coarse determination steps require about 40% of the number of instructions per second required by the fine determination steps 112 and 114."

It should now be appreciated that the objects of the present invention have been satisfied. While the present invention has been described in particular detail, it should also be appreciated that numerous modifications are possible within the intended spirit and scope of the invention. In interpreting the appended claims it should be understood that:

a) the word "comprising" does not exclude the presence of other elements or steps than those listed in a claim;

b) the word "a" or "an" preceding an element does not exclude the presence of a plurality of such elements.

c) any reference signs in the claims do not limit their scope; and d) several "means" may be represented by the same item of hardware or software implemented structure or function.

What is claimed is:

1. A method of rate detection at a receiving end of a digital communications system of a type wherein convolutional encoded digital data transmitted over a medium has an information data rate variably selected at a transmitting end from a rate set containing a full rate and one or more possible lower rates which equals the full rate divided by respective different integers k associated with the possible lower rates, the data being repeated for the lower rates to achieve the same apparent transmission rate as the full rate, said method comprising:

first determining the data rate of received convolutional encoded data in accordance with a coarse decision method before any Viterbi decoding of the data;

if the first determined data rate is one of the lower rates, first de-repeating the received convolutional encoded data in accordance with the first determined data rate;

first Viterbi decoding the received convolutional encoded data in accordance with the first determined data rate, after any de-repetition; and evaluating whether to select the data rate as equal to the first determined data rate utilizing data available from or after the first Viterbi decoding.

2. The method as claimed in claim 1, wherein said evaluating comprises:

first convolutional re-encoding the Viterbi decoded data in accordance with the first determined data rate;

first forming a correlation between the received convolutional encoded data after any de-repetition at the first determined data rate and the convolutional re-encoded data;

comparing the first formed correlation with a first predetermined threshold associated with the first determined data rate; and selecting the date rate as equal to the first determined rate when the first formed correlation is greater than or is equal to the first predetermined threshold determined rate when the first formed correlation is greater than or is equal to the first predetermined threshold.

3. The method as claimed in claim 2, further comprising, when the first formed correlation is less than the first predetermined threshold:

second Viterbi decoding the received convolutional encoded data in accordance with at least one other data rate of the rate set, after de-repetition if the at least one other data rate is one of the lower rates; and second determining the data rate in accordance with a fine decision method from data available from or after the second Viterbi decoding.

4. The method as claimed in claim 2, further comprising, when the first formed correlation is less than the first predetermined threshold associated with the first determined data rate, for each other data rate of the applicable rate set:

second de-repeating the received convolutional encoded data in accordance with each other data rate which is one of the lower rates;

second Viterbi decoding the received convolutional encoded data in accordance with each other data rate, after any de-repetition;

second convolutional re-encoding the Viterbi decoded data in accordance with each other data rate;

second forming correlations between the received convolutional encoded data after any de-repetition and the convolutional re-encoded data at each other data rate; and second determining the data rate utilizing the first and second formed correlations.

5. The method as claimed in claim 4 wherein said second determining comprises considering data rates beginning with the full rate, and selecting the data rate as equal to the considered rate when the correlation formed at the considered data rate satisfies a set of one or more conditions.

6. The method as claimed in claim 5, wherein one of the conditions is whether the correlation formed at the considered data rate plus a second predetermined threshold associated with the considered data rate is greater than a largest of the correlations formed at the other data rates.

7. The method as claimed in claim 6, wherein a further one of the conditions is whether a Cyclic Redundancy Code check with respect to the decoded received convolution encoded data for the considered data rate does not fail.

8. The method as claimed in claim 6, wherein a further one of the conditions is whether the correlation formed for the considered data rate is greater than a third predetermined threshold associated with the considered data rate.

9. The method as claimed in claims 1–8, wherein said first determining includes forming for each of the possible data rates, measures of the extent to which predetermined patterns of successive symbols in the convolutional encoded data match.

10. The method as claimed in claim 9, wherein the predetermined patterns take into consideration puncturing of the data which has occurred prior to transmission.

11. Apparatus for rate detection at a receiving end of a digital communications system of a type wherein convolutional encoded digital data transmitted over a medium has an information data rate variably selected at a transmitting end from a rate set containing a full rate and one or more possible lower rates which equals the full rate divided by respective different integers k associated with the possible lower rates, the data being repeated for the lower rates to achieve the same apparent transmission rate as the full rate, said apparatus comprising:

rate decision means configured for first determining the data rate of received convolutional encoded data in accordance with a coarse decision method before any Viterbi decoding of the data;

means for first de-repeating the received convolutional encoded data in accordance with the first determined data rate, if the first determined data rate is one of the lower rates;

means for first Viterbi decoding the received convolutional encoded data in accordance with the first determined data rate, after any de-repetition; and means for evaluating whether to select the data rate as equal to the first determined data rate utilizing data available from or after the first Viterbi decoding.

12. The apparatus as claimed in claim 11, wherein said means for evaluating comprises:

means for first convolutional re-encoding the Viterbi decoded data in accordance with the first determined data rate;

means for first forming a correlation between the received convolutional encoded data after any de-repetition at the first determined data rate and the convolutional re-encoded data;

and means implemented by the rate decision means for comparing the first formed correlation with a first predetermined threshold associated with the first determined data rate, and for selecting the date rate as equal to the first determined rate when the first formed correlation is greater than or is equal to the first predetermined threshold.

13. The apparatus as claimed in claim 12, further comprising, for when the first formed correlation is less than the first predetermined threshold:

means for second Viterbi decoding the received convolutional encoded data in accordance with at least one other data rate of the rate set, after de-repetition if the at least one other data rate is one of the lower rates; and means implemented by the rate decision means for second determining the data rate in accordance with a fine decision method from data available from or after the second Viterbi decoding.

* * * * *